United States Patent [19]
Mori

[11] Patent Number: 5,953,548
[45] Date of Patent: Sep. 14, 1999

[54] INVERTED GALILEAN TYPE VARIABLE MAGNIFICATION ZOOM FINDER

[75] Inventor: Akira Mori, Kawasaki, Japan

[73] Assignee: Olmypus Optical Co., Ltd., Tokyo, Japan

[21] Appl. No.: 08/864,966

[22] Filed: May 29, 1997

[30] Foreign Application Priority Data

May 30, 1996 [JP] Japan ................................ 8-136911

[51] Int. Cl.⁶ .................................................. G03B 13/10

[52] U.S. Cl. .................................................... 396/379

[58] Field of Search ............................... 396/84, 379, 378

[56] References Cited

U.S. PATENT DOCUMENTS 5,300,977  4/1994  Lewis et al. ............................. 396/84
5,404,189  4/1995  Labaziewicz et al. .................. 396/378

FOREIGN PATENT DOCUMENTS 60-128329  8/1985  Japan .

*Primary Examiner*—W. B. Perkey
*Attorney, Agent, or Firm*—Pillsbury Madison & Sutro LLP

[57] ABSTRACT

An inverted Galilean type variable magnification zoom finder has a field frame, which can be moved in accordance with a change in magnification of a finder optical system. The field frame may be moved integral with, or independently of, a lens or a lens unit.

9 Claims, 3 Drawing Sheets

INVERTED GALILEAN TYPE VARIABLE MAGNIFICATION ZOOM FINDER

BACKGROUND OF THE INVENTION

1. Field of the Invention

This invention relates to a variable magnification zoom finder chiefly used in a compact camera, and in particular, to an inverted Galilean type variable magnification zoom finder.

2. Description of Related Art

An example of an optical system of a conventional virtual image mode variable magnification zoom finder for compact cameras is shown in FIGS. 1A–1C. The optical system of this finder includes a first fixed lens 1, a second fixed lens 2, and a third fixed lens 3 which are arranged on an optical axis a; a moving lens 4 disposed between the first fixed lens 1 and the second fixed lens 2 to be movable along the optical axis a; and a fixed field frame 5 disposed such that it is stationary on the side of a pupil b of the first fixed lens 1.

In the above optical system, a height of a chief ray from the optical axis a at the fixed field frame 5 has a minimum $h_1$ where the moving lens 4 is located at a wide-angle position (FIG. 1A). As the moving lens 4 is moved from the wide-angle position toward a telephoto position (FIG. 1B), a height $h_2$ of the chief ray from the optical axis a at the fixed field frame 5 is progressively increased and reaches a maximum $h_3$ where the moving lens 4 is located at the telephoto position (FIG. 1C). In short, the conventional virtual image mode variable magnification zoom finder is merely designed so that the single fixed field frame 5 is placed to accommodate a change in magnification of the finder.

In general, an angle made by the optical axis with the chief ray emerging from an eyepiece system and reaching a pupil is set to be constant in order to make a field factor constant over the range from the wide-angle position to the telephoto position. In the conventional finder optical system shown in FIGS. 1A–1C, however, a field area is determined by the single field frame 5, and thus the height of the chief ray from the optical axis a at a lens (or a lens unit) is varied in accordance with the magnification change from the wide-angle position to the telephoto position (namely, as shown in FIGS. 1A–1C, $h_1<h_2<h_3$). For this reason, the angle of the chief ray reaching the pupil does not become constant and unwanted light reaches the pupil, causing the problem of hindering the determination of the composition of photography.

In order to avoid this problem, albada type variable magnification zoom finders have been often used in recent years. FIGS. 2A–2C show an example of the albada type variable magnification zoom finder. This albada type finder includes a first fixed lens 6 and a second fixed lens 7 which are arranged on the optical axis a; a half mirror 8 interposed between the first fixed lens 6 and the second fixed lens 7, having a half mirror surface 8a; and a moving lens 9 movable along the optical axis a between the first fixed lens 6 and the half mirror 8.

The albada type variable magnification zoom finder has the advantage that when an optical frame c is attached to the eyepiece system, a photographing area becomes clear and the determination of the composition can be accurately made. However, the albada type variable magnification zoom finder, which imperatively requires the half mirror surface 8a to be situated at an arbitrary place, has the problem that the transmittance of the entire finder system is reduced and as a result, the entire visual field becomes dark, detrimental light such as ghost attributable to the half mirror surface 8a is produced, or a rise in manufacturing cost is caused because of the placement of the half mirror.

Japanese Utility Model Preliminary Publication No. Sho 60-128329 discloses an inverted Galilean type finder in which two field frames of different sizes are provided and alternately placed on the optical axis, thereby allowing the magnification to be changed.

This inverted Galilean type finder, however, requires a complicated mechanism for alternately inserting the two field frames in the optical axis and thus is not necessarily suitable for the latest camera requiring compact design.

SUMMARY OF THE INVENTION

It is, therefore, an object of the present invention to provide a variable magnification zoom finder, notably an inverted Galilean type variable magnification zoom finder, which can bring about a proper field area over the range from the wide-angle position to the telephoto position without using the arrangement of the albada type variable magnification zoom finder.

In order to achieve this object, the inverted Galilean type variable magnification zoom finder according to the present invention is constructed so that a field frame is provided and variable in accordance with the magnification change. Specifically, the field frame is designed to be movable along the optical axis.

In the inverted Galilean type variable magnification zoom finder of the present invention, a moving lens (or a lens unit) is moved in accordance with a change in focal length of a photographing lens optical system, and in keeping with this, the position of the field frame is shifted to thereby secure a proper field area with respect to a photographing area, no matter whether the focal length of the photographing lens optical system corresponds to the wide-angle position or the telephoto position.

For example, the field frame can be designed so that it can be moved integrally with a lens or lens unit, or independently of it.

In a technique of moving the field frame integrally with a lens or lens unit, a fixed field frame is disposed at an arbitrary place, the height of the chief ray from the optical axis at the telephoto position and a movable field frame constructed integrally with a moving lens is determined, the height of the chief ray from the optical axis at the wide-angle position is determined by the arrangement in the finder optical system. By doing so, the optical system which is simple in arrangement and has the same function as in the albada type variable magnification zoom finder can be obtained. However, the positions of the field frames at the wide-angle and telephoto positions may be reversed, depending on the lens type.

In a technique of moving the field frame independently of a lens or lens unit, on the other hand, since the chief ray can be intercepted at almost the same height as that of the chief ray determining the field factor over the entire region from the wide-angle position to the telephoto position, this technique can linearly accommodate the entire region, and the field area can be secured with respect to the photographing area.

The field frame may be constructed by mechanical means or may also be constructed in such a way that paint is applied to the side or end surface of a lens, or a treatment may be carried out such that the lens has a diffusing surface.

DETAILED DESCRIPTION OF THE PREFERRED EMBODIMENT

Figure 1A:
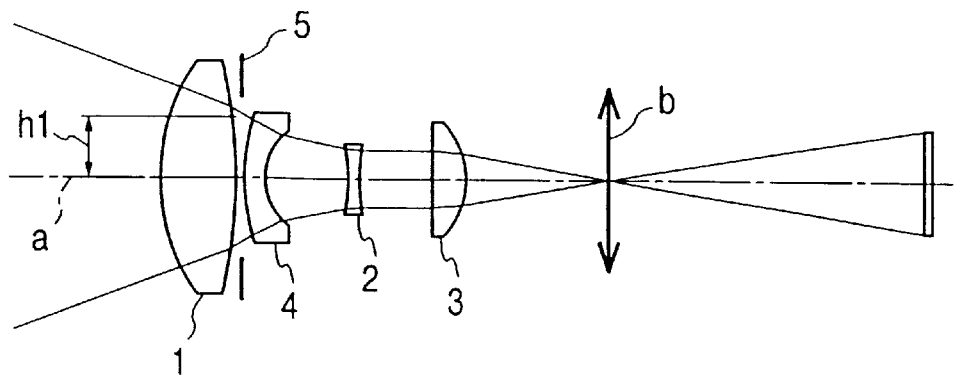
FIGS. 1A, 1B, and 1C are schematic views showing operating conditions of a conventional inverted Galilean type variable magnification zoom finder.
Figure 1B:
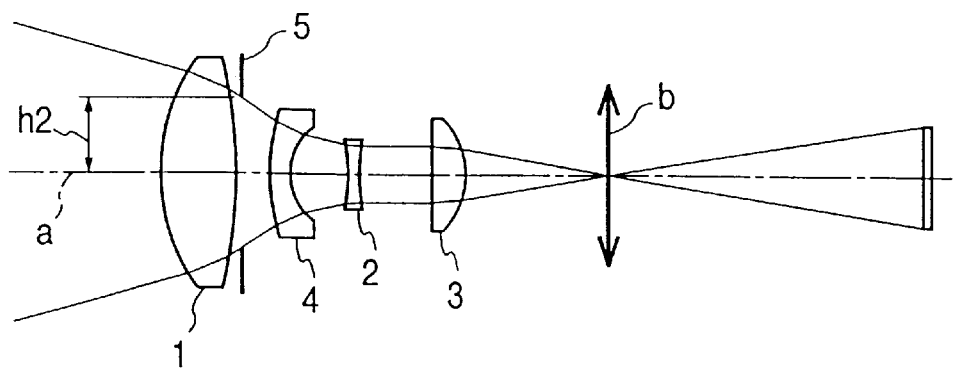
Figure 1C:
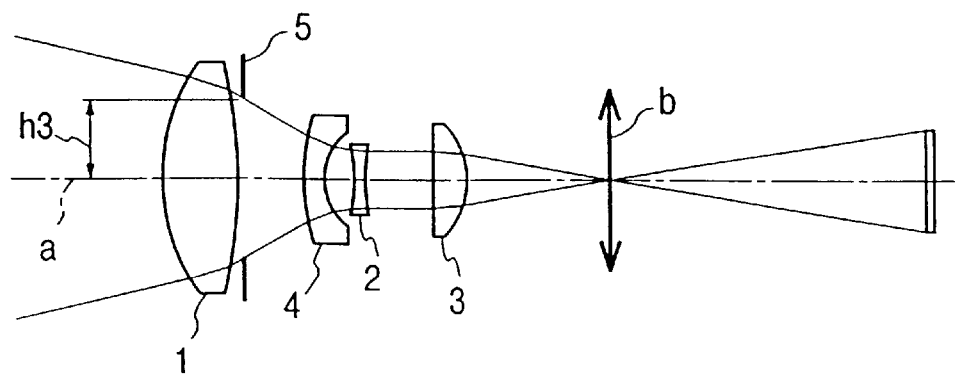
Figure 2A:
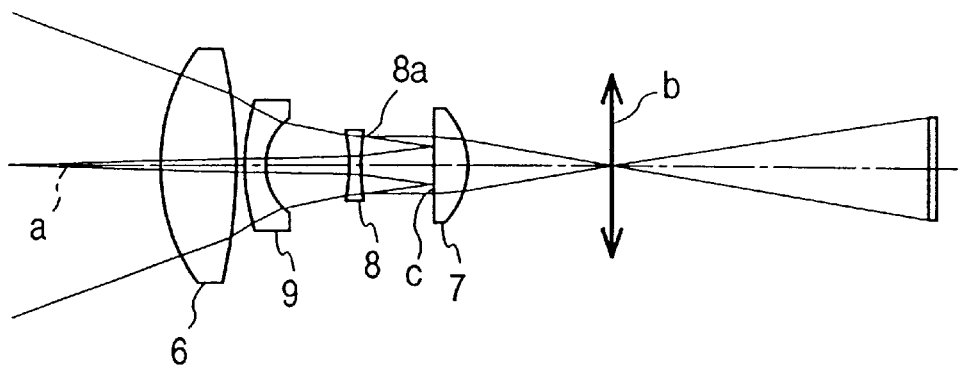
FIGS. 2A, 2B, and 2C are schematic views showing operating conditions of a conventional albada type variable magnification zoom finder.
Figure 2B:
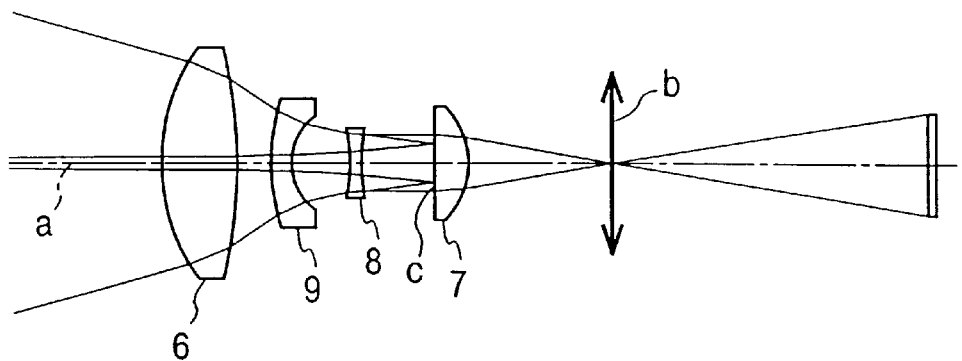
Figure 2C:
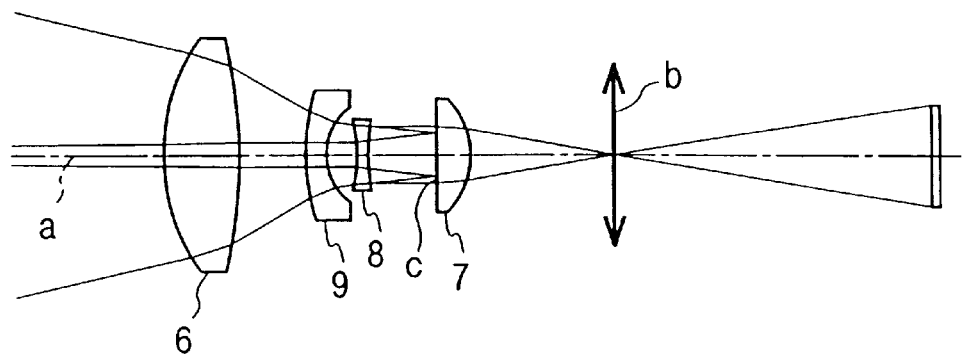
Figure 3A:
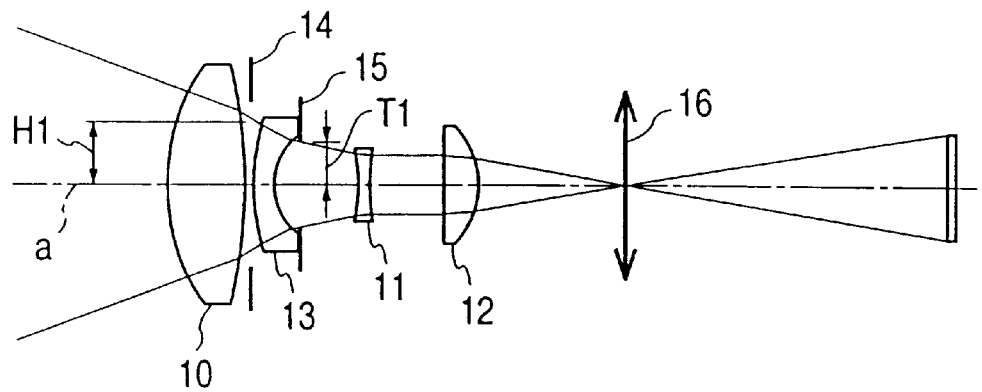
FIGS. 3A, 3B, and 3C are schematic views showing operating conditions of an inverted Galilean type variable magnification zoom finder of an embodiment in the present invention.
Figure 3B:
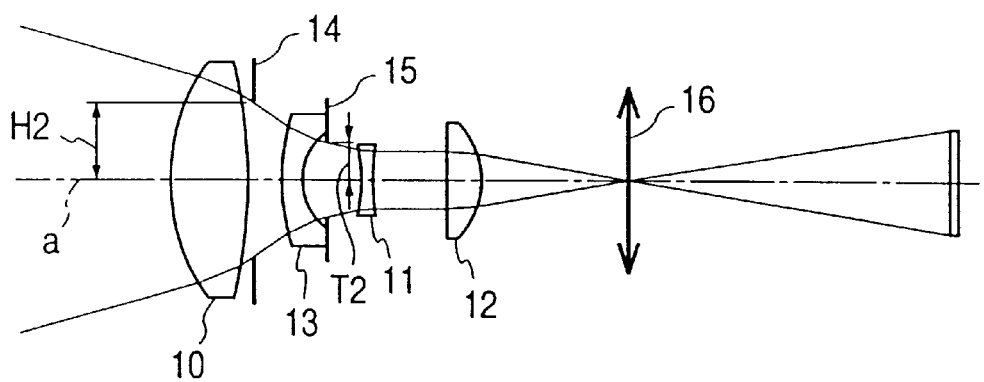
Figure 3C:
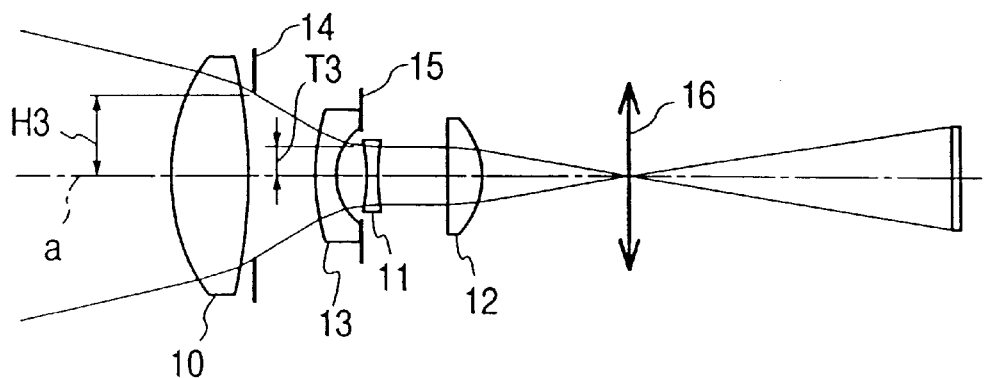

An embodiment of the inverted Galilean type variable magnification zoom finder according to the present invention Is shown in FIGS. 3A–3C. The inverted Galilean type variable magnification zoom finder in this embodiment, as shown in these figures, includes a first fixed lens 10, a second fixed lens 11, and a third fixed lens 12 which are arranged on the optical axis a and a moving lens 13 disposed to be movable along the optical axis a between the first fixed lens 10 and the second fixed lens 11. A fixed field frame 14 is placed on the pupil side of the first fixed lens 10, and a field frame 15 is attached to the surface of the moving lens 13 facing the pupil. That is, the field frame 15 can be moved, together with the moving lens 13, along the optical axis a.

When the focal length of the photographing lens optical system corresponds to the wide-angle position, the moving lens 13 in the finder optical system, as shown in FIG. 3A, is located on the object side, namely closest to the first fixed lens 10. As the focal length of the photographing lens optical system is changed to transfer the optical system from the wide-angle position to the telephoto position, the moving lens 13, as shown in FIG. 3B, is moved from the object side toward a pupil 16, namely from the first fixed lens 10 toward the second fixed lens 11. When the focal length of the photographing lens optical system corresponds to the telephoto position, the moving lens 13, as shown in FIG. 3C, is located on the side of the pupil 16, namely closest to the second fixed lens 11.

The inverted Galilean type variable magnification zoom finder of the embodiment thus constructed functions as follows:

Calling $H_1$ the height of the chief ray from the optical axis a at the fixed field frame 14 when the moving lens 13 is located at the wide-angle position (FIG. 3A), $H_2$ the height of the chief ray from the optical axis a at the fixed field frame 14 when the moving lens 13 is located midway between the wide-angle position and the telephoto position (FIG. 3B), and $H_3$ the height of the chief ray from the optical axis a at the fixed field frame 14 when the moving lens 13 is located at the telephoto position (FIG. 3C), the following condition is established:

$$H_1 < H_2 < H_3$$

Specifically, the height of the chief ray from the optical axis a at the fixed field frame 14 is minimized when the moving lens 13 is located at the wide-angle position, is progressively increased when the moving lens 13 is moved from the wide-angle position toward the telephoto position, and is maximized when the moving lens 13 is located at the telephoto position.

In contrast to this, when $T_1$ denotes the height of the chief ray from the optical axis a at the moving field frame 15 where the moving lens 13 is located at the wide-angle position (FIG. 3A), $T_2$ the height of the chief ray from the optical axis a at the moving field frame 15 where the moving lens 13 is located midway between the wide-angle position and the telephoto position (FIG. 3B), and $T_3$ the height of the chief ray from the optical axis a at the moving field frame 15 where the moving lens 13 is located at the telephoto position (FIG. 3C), the following condition is established:

$$T_1 > T_2 > T_3$$

Specifically, the height of the chief ray from the optical axis a at the moving field frame 15 is maximized when the moving lens 13 is located at the wide-angle position, is progressively decreased as the moving lens 13 is moved from the wide-angle position toward the telephoto position, and is minimized when the moving lens 13 is located at the telephoto position.

In this way, the field area at the wide-angle position, as shown in FIG. 3A, is determined by the behavior of the moving field frame 15 intercepting rays of light outside the field area, while the field area at the telephoto position, as shown in FIG. 3C, is determined by the behavior of the fixed field frame 14 intercepting rays of light outside the field area.

Thus, according to the present invention, a proper field area can be obtained with respect to the photographing area, no matter whether the focal length of the photographing lens optical system corresponds to the wide-angle position or the telephoto position. The above behavior may be reversed, depending on the lens type, but in this case, it is only necessary to interchange the field frames 14 and 15.

What is claimed is:

1. An inverted Galilean type variable magnification zoom finder comprising:

a first field frame disposed in an optical path of said inverted Galilean type variable magnification zoom finder; and a second field frame disposed in said optical path and at a position that is different from a position of said first field frame, wherein said first field frame and said second field frame remain in said optical path.

2. An inverted Galilean type variable magnification zoom finder according to claim 1, wherein said first field frame is fixedly positioned on an optical axis as a fixed field frame, and said second field frame is constructed to be movable along the optical axis as a moving field frame.

3. An inverted Galilean type variable magnification zoom finder according to claim 2, wherein said fixed field frame is disposed at a position where said fixed field frame determines a height of a chief ray from the optical axis in a telephoto position of the zoom finder, and said moving field frame is allowed to be set at a position where said moving field frame determines a height of a chief ray from the optical axis in a wide-angle position of the zoom finder.

4. An inverted Galilean type variable magnification zoom finder according to claim 2, wherein said moving field frame is integrally movable with a movable lens.

5. An inverted Galilean type variable magnification zoom finder according to claim 2, wherein the following conditions are satisfied:

$H1 < H2 < H3$ $T1 > T2 > T3$ where H1, H2 and H3 are heights of the chief ray from the optical axis at the position of said fixed field frame as a moving lens of the zoom finder is in a wide-angle position, an intermediate position, and a telephoto position, respectively, and where T1, T2 and T3 are heights of the chief ray from the optical axis at the position of said moving field frame as the moving lens of the zoom finder is in the wide-angle position, the intermediate position, and the telephoto position, respectively.

6. An inverted Galilean type variable magnification zoom finder according to claim 2, wherein said moving field frame determines a field area for a wide-angle position by intercepting rays of light outside the field area for the wide-angle position, and said fixed field frame determines a field area for a telephoto position by intercepting rays of light outside the field area for the telephoto position.

7. An inverted Galilean type variable magnification zoom finder comprising, in order from an object side:

a first fixed lens;
a first field frame;
a moving lens;
a second field frame;
a second fixed lens; and
a third fixed lens.

8. An inverted Galilean type variable magnification zoom finder according to claim 7, wherein said first fixed lens has a positive refracting power, said second fixed lens has a negative refracting power, said third fixed lens has a positive refracting power, and said moving lens has a negative refracting power.

9. An inverted Galilean type variable magnification zoom finder comprising a field frame, said field frame being movable along an optical axis in such a manner that a height of a chief ray as intercepted by said field frame is substantially the same as a reference height of the chief ray over an entire zoom range from a wide-angle position through a telephoto position, the reference height of the chief ray determining a field factor.

* * * * *